US009111664B2

(12) United States Patent
Goto

(10) Patent No.: US 9,111,664 B2
(45) Date of Patent: Aug. 18, 2015

(54) MANUFACTURING METHOD OF ENAMELED FLAT WIRE USING DIE FOR FLAT WIRE COATING

(71) Applicant: Hitachi Metals, Ltd., Minato-ku, Tokyo (JP)

(72) Inventor: Masayoshi Goto, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 239 days.

(21) Appl. No.: 13/939,597

(22) Filed: Jul. 11, 2013

(65) Prior Publication Data
US 2013/0300022 A1 Nov. 14, 2013

Related U.S. Application Data

(62) Division of application No. 12/977,627, filed on Dec. 23, 2010, now Pat. No. 8,677,926.

(30) Foreign Application Priority Data

Jan. 8, 2010 (JP) .................................. 2010-002605

(51) Int. Cl.
B05D 7/20 (2006.01)
H01B 13/16 (2006.01)
(Continued)

(52) U.S. Cl.
CPC .. *H01B 7/08* (2013.01); *B05C 1/04* (2013.01); *B05C 3/12* (2013.01); *B05C 3/125* (2013.01); *B05D 7/20* (2013.01); *C03C 25/12* (2013.01); *C03C 25/18* (2013.01); *H01B 13/065* (2013.01); *H01B 13/16* (2013.01); *H01B 13/24* (2013.01)

(58) Field of Classification Search
None
See application file for complete search history.

(56) References Cited

U.S. PATENT DOCUMENTS 2,238,575 A * 4/1941 Alexay .......................... 118/125
2,287,589 A * 6/1942 Wilson et al. ................. 118/125
(Continued)

FOREIGN PATENT DOCUMENTS

JP 59-063945 4/1984
JP 10-079204 3/1998
(Continued)

OTHER PUBLICATIONS

JP Office Action of Appln. No. 2014-020026 dated May 13, 2014 with partial English translation.
(Continued)

Primary Examiner — Dah-Wei D Yuan
Assistant Examiner — Binu Thomas
(74) Attorney, Agent, or Firm — Crowell & Moring LLP

(57) ABSTRACT

A manufacturing method uses a solid coating die for applying an insulation varnish around a flat wire conductor. The die includes a die body and a die hole formed through the die body, into which the conductor is inserted. The die hole includes an entry portion having a cross section monotonically decreasing along a conductor insertion direction, and a coating portion including at least a sub-portion having a constant cross section. The cross section of the coating portion is a rectangle having four straight sides and four rounded corners. Each inner surface of each straight side has an inwardly projecting protrusion, a top contour of each protrusion being a circular arc, an elongated circular arc, an elliptical arc or a combination of these arcs, the maximum curvature of the top contour of each protrusion being larger than the maximum curvature of inner surface of the rounded corners.

6 Claims, 7 Drawing Sheets

(51) Int. Cl.
*H01B 13/24* (2006.01)
*H01B 7/08* (2006.01)
*C03C 25/12* (2006.01)
*C03C 25/18* (2006.01)
*H01B 13/06* (2006.01)
*B05C 1/04* (2006.01)
*B05C 3/12* (2006.01)

(56) References Cited

U.S. PATENT DOCUMENTS

| | | | | |
|---|---|---|---|---|
| 2,345,390 | A * | 3/1944 | Flynn | 427/120 |
| 2,346,697 | A * | 4/1944 | Mungall | 118/125 |
| 2,433,642 | A * | 12/1947 | Bailey | 118/125 |
| 3,018,199 | A * | 1/1962 | Lit et al. | 427/118 |
| 4,130,676 | A * | 12/1978 | Ichiyanagi et al. | 427/358 |
| 4,281,617 | A * | 8/1981 | Bevers et al. | 118/68 |
| 4,294,189 | A * | 10/1981 | Ashida et al. | 118/603 |
| 2008/0159802 | A1 * | 7/2008 | Goto | 401/1 |
| 2011/0171368 | A1 | 7/2011 | Goto | |
| 2012/0164315 | A1 * | 6/2012 | Goto | 427/117 |

FOREIGN PATENT DOCUMENTS

| | | |
|---|---|---|
| JP | 2000-260233 | 9/2000 |
| JP | 2003-297164 | 10/2003 |
| JP | 2004-134113 | 4/2004 |
| JP | 2011-142030 | 7/2011 |

OTHER PUBLICATIONS

JP Office Action of Appln. No. 2014-020026 dated Oct. 14, 2014 with partial English translation.

* cited by examiner

JUST AFTER VARNISH APPLICATION

↓

AFTER BAKING

JUST AFTER VARNISH APPLICATION

↓

AFTER BAKING

JUST AFTER VARNISH APPLICATION

↓

AFTER BAKING

JUST AFTER VARNISH APPLICATION

AFTER BAKING

JUST AFTER VARNISH APPLICATION

AFTER BAKING

MANUFACTURING METHOD OF ENAMELED FLAT WIRE USING DIE FOR FLAT WIRE COATING

CROSS-REFERENCE TO RELATED APPLICATION

This application is a divisional application of U.S. application Ser. No. 12/977,627 filed Dec. 23, 2010, the contents of which are incorporated herein by reference.

CLAIM OF PRIORITY

The present application claims priority from Japanese patent application serial no. 2010-002605 filed on Jan. 8, 2010, the content of which is hereby incorporated by reference into this application.

BACKGROUND OF THE INVENTION

1. Field of the Invention

The present invention relates to dies for applying insulation enamel coatings to wires (hereinafter referred to as "coating dies"), and particularly to dies for coating flat wires (which are advantageously used to increase the filling factor (space factor) of coils). Furthermore, the invention relates to methods for manufacturing enameled flat wires using the invented dies.

2. Description of Related Art

Enameled wires (enamel covered insulated wires) are widely used for coil wires in electrical equipment such as motors and transformers. Such enameled wires are formed by covering an insulation coating around a metal conductor having a desired cross section (such as circular or rectangular) depending on the shape and application of the coil. With the current trend toward small and high power vehicle motors (such as alternators), increasing demands exist for enameled flat wires (having a rectangular cross section) that can be wound into a coil more densely than enameled round wires (having a circular cross section). In order to achieve more accurate coil winding and a higher coil filling factor, there also exist demands for thinner and more uniform insulation enamel coatings.

Known coating dies for applying an insulation enamel (varnish) around a conductor are classified into die assemblies and solid dies. Die assemblies will be explained first. FIG. 1 is a schematic illustration showing, an example of a die part of a die assembly for flat wire coating, front, side and top views and an enlarged view of the principal portion. FIG. 2 is a schematic illustration showing a top view of a die assembly assembled from four die parts shown in FIG. 1.

As illustrated in FIG. 1, the die part 1 includes a cylindrical die body 2 and an approximately cubic die base 3. The die base 3 has an insertion hole 4 for insertion of the die body 2 of another die part 1. The cylindrical surface of the die body 2 has numerous annular coating grooves 5 for supplying an insulation varnish therethrough in order to apply the varnish around a flat wire conductor. As illustrated in FIG. 2, a die assembly 6 for flat wire coating is assembled from four FIG. 1 die parts 1. The space surrounded by the four die parts 1 forms a die hole 7 for insertion of a flat wire conductor in order to apply an insulation varnish around the conductor.

Such die assemblies for enameling flat wires (also referred to as "flat wire coating die assemblies") as shown in FIGS. 1 and 2 have an advantage of being adaptable to different size flat wire conductors. That is, the die hole size of a die assembly can be changed by adjusting the insertion depth of each die body into the corresponding die base hole when assembling the die assembly from a set of die parts (four parts in FIG. 2). Also, die assemblies have another advantage that a die assembly can be readily assembled and disassembled, and therefore it can be replaced with another die assembly without the need for cutting a flat wire conductor.

Although die assemblies have the above advantage of being adaptable to different size flat wire conductors, they have the following disadvantage. It is difficult to accurately and controllably adjust the gap between the die hole of a die assembly and a flat wire conductor to be coated. Therefore, die assemblies cannot be used to form enameled wires requiring a very small allowable error (or tolerance) for the coating thickness or the finished dimensions.

Next, solid dies will be explained. Solid dies include: A die body (typically, approximately cylindrical) and a die hole of a fixed shape and dimensions formed through the die body. As just noted, the die hole of solid dies has a fixed shape and dimensions. Therefore, the gap between a die hole and a conductor to be coated can be accurately adjusted, and as a result an insulation varnish can be uniformly applied around the conductor. Thus, solid dies are suitably used to manufacture enameled wires requiring a small tolerance for the coating thickness or the finished dimensions.

Besides the above two types of coating dies, JP-A 2003-297164 discloses an assemblable/disassemblable coating die which combines the advantage of the accurate coating capability of solid dies with the advantage of the assemblability/disassemblability of die assemblies. Needless to say, the die hole of solid dies for enameled flat wires (also referred to as "flat wire coating solid dies") has a rectangular cross section.

There still remains a yet-unsolved problem shared by all of the above listed types of coating dies—circumferential non-uniformity in coating thickness. More specifically, a coating formed around a flat wire by a conventional coating die is prone to be selectively thinner on each rounded corner of the flat wire and thicker on the both sides of the corner. That is, an undesirable local thickening/thinning phenomenon (what is called a dog-bone phenomenon, see later-described FIG. 7) is prone to occur on each rounded corner of the flat wire. Conventional thinking has been that this phenomenon is caused by the surface tension difference of an applied insulation varnish and is unavoidable in coatings formed by conventional coating dies.

There has been a strong demand for solutions to this problem because thickness nonuniformities of an insulation coating (such as a dog-bone surface) may degrade the high voltage electrical insulation and also may make accurate coil winding difficult. In order to prevent such a undesirable local thickening/thinning phenomenon, JP-A 2004-134113 discloses an insulated flat wire in which each corner of a flat wire conductor to be coated is shaped in such a manner that the cross section has a polygonal shape (i.e., has two or more vertices). The total number of vertices per flat wire conductor is 8 or more, and each vertex angle is 120° or more. According to this JP-A 2004-134113, the corners of the flat wire conductor are not exposed to the coating surface, the coating thicknesses on the corners of the conductor are sufficiently thick, and the resulting insulated flat wire has excellent electrical insulation properties.

As described above, there is an increasing demand for enameled flat wires in terms of the filling factor of coil windings as well as for uniform insulation enamel coatings in terms of breakdown voltage and coil winding accuracy. The technology disclosed in the above JP-A 2004-134113 has an advantage that an insulation coating can be uniformly formed. However, the cross section of the flat wire conductor used in this technology is close to a race-track shape (or an elongated circle) rather than a rectangle; therefore, coils wound from such a flat wire may not have a satisfactorily high filling factor.

As for solid dies, they can be advantageously used to form uniform insulated round wires. However, even solid dies cannot be effectively used to form uniform enameled flat wires because the above-described undesirable local thickening/thinning (dog-bone) phenomena inevitably tends to occur. And, there have not yet been proposed any practical solutions to this problem of local thickening/thinning (dog-bone) phenomenon accompanying the flat wire enameling processes.

SUMMARY OF THE INVENTION

In view of the foregoing, it is an objective of the present invention to provide a flat wire coating die and a manufacturing method of enameled flat wires, by which the entire surface of a long flat wire conductor can be stably coated with a uniform thickness insulation coating without any undesirable significant local thickening/thinning.

(I) According to one aspect of the present invention, there is provided a solid coating die for applying an insulation varnish around a flat wire conductor, which includes:

a die body; and a die hole formed through the die body, the conductor to be inserted into the die hole in a conductor insertion direction, the die hole including:

an entry portion having a cross section monotonically decreasing along the conductor insertion direction; and a coating portion including at least a sub-portion having a constant cross section, the cross section of the coating portion being a rectangle having four straight sides and four rounded corners, the coating portion having a flat inner surface corresponding to each straight line of the rectangular cross section of the coating portion, the coating portion having a rounded inner surface corner corresponding to each rounded corner of the rectangular cross section of the coating portion, each flat inner surface of the coating portion having an inwardly projecting protrusion, a top contour (perpendicular to the conductor insertion direction) of each protrusion being a circular arc, an elongated circular arc, an elliptical arc or a combination of these arcs, the maximum curvature of the top contour of each protrusion being larger than the maximum curvature of the rounded inner surface corners.

As used herein and the appended claims, the term "rectangle (rectangular)" refers to a rectangle (including a square) whose four corners are rounded. Also, the term "top portion of a protrusion" refers to a portion of the protrusion from about half of the height to the peak height, and the term "top contour of a protrusion" refers to the contour (perpendicular to a conductor insertion direction) of the top portion of the protrusion.

(II) According to another aspect of the present invention, there is provided a manufacturing method of an enameled flat wire, which includes the steps of:

inserting a flat wire conductor into the die hole of the above-described coating die;

applying an insulation varnish around the flat wire conductor in the die hole; and baking the applied insulation varnish.

In the above aspects (I) and (II) of the present invention, the following modifications and changes can be made.

(i) The distance between each protrusion and the nearer side of one of the rounded inner surface corners that is nearest to the protrusion is shorter than a predetermined value.

As used herein and in the appended claims, the term "a side of a rounded inner surface corner" refers to the boundary between the rounded inner surface corner and the corresponding adjacent flat inner surface.

(ii) The predetermined value is the minimum curvature radius of the rounded inner surface corner that is nearest to the protrusion.

(iii) Each protrusion is an elongated ridge running parallel to the conductor insertion direction.

(iv) Each protrusion extends in the conductor insertion direction and along the entire length of the coating region.

(v) The protrusions on at least two of the four flat inner surfaces have the same height.

Advantages of the Invention

According to the present invention, it is possible to provide a flat wire coating die and a manufacturing method of enameled flat wires, by which the entire surface of a long flat wire conductor is stably coated with a uniform thickness insulating coating without any undesirable significant local thickening/thinning. Also, by using enameled flat wires formed by the invented die, accurate coil windings having a high filing factor can be provided.

DETAILED DESCRIPTION OF THE PREFERRED EMBODIMENTS

The present inventor has extensively investigated the above-described undesirable local thickening/thinning phenomenon which occurs in flat wire enameling processes. In particular, the inventor has intensively investigated, for various cases, the insulation varnish flow just after the varnish application until the completion of the baking. The present invention was developed based on these results.

Figure 1:
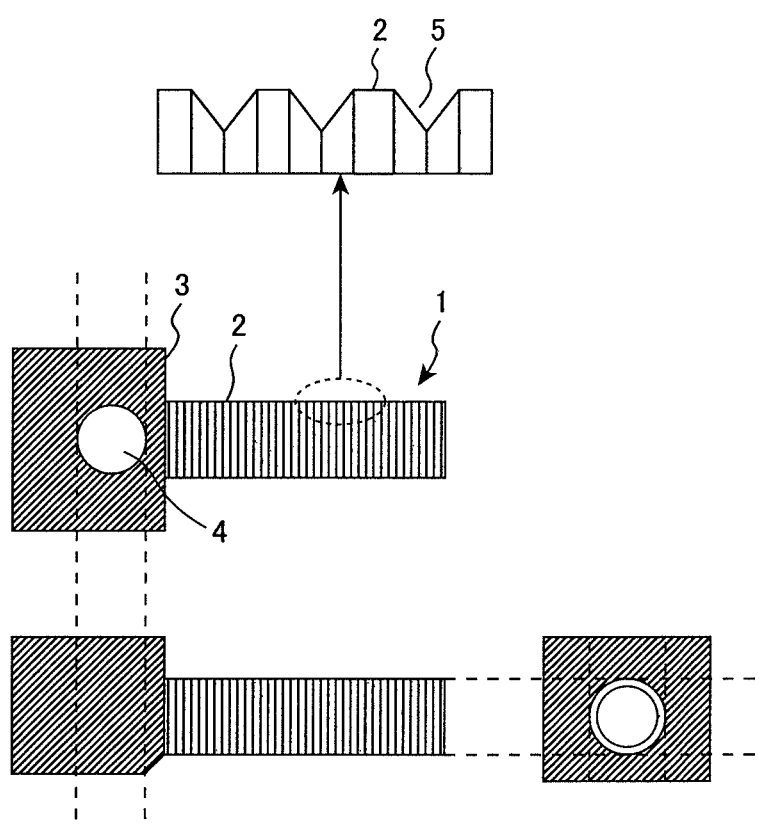
FIG. 1 is a schematic illustration showing, an example of a die part of a die assembly for flat wire coating, front, side, and top views, and an enlarged view of the principal portion.
Figure 2:
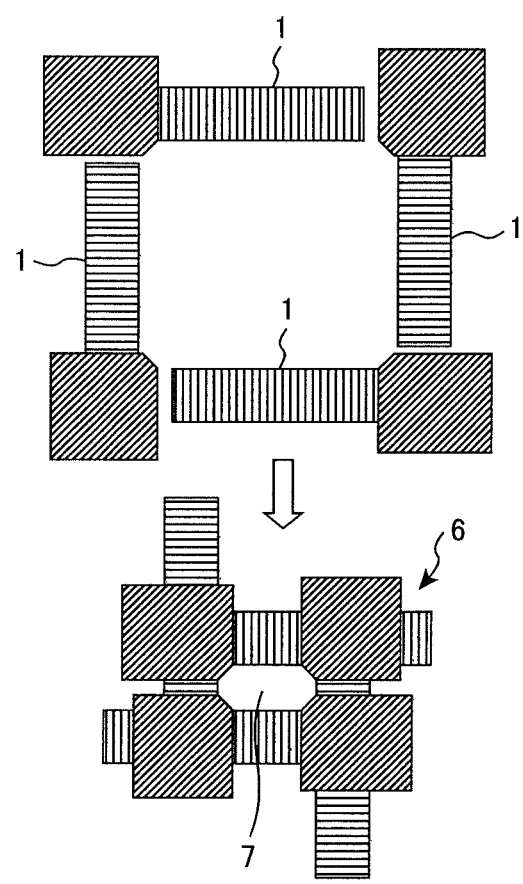
FIG. 2 is a schematic illustration showing a top view of a die assembly assembled from four die parts shown in FIG. 1.
Figure 3:
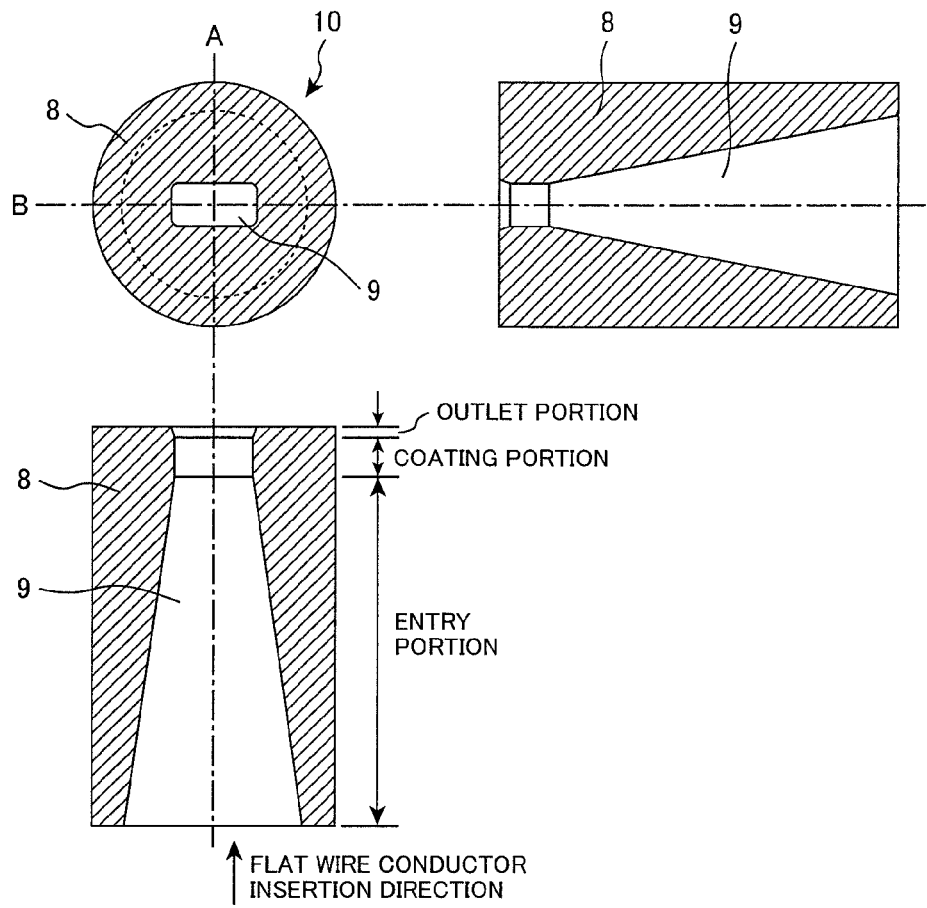
FIG. 3 is a schematic illustration showing, an example of a conventional solid die for flat wire coating, a cross sectional view, and longitudinal sectional views along lines A and B.

First, undesirable local thickening/thinning phenomena which occurs in insulation coatings formed by conventional solid dies for flat wire coating will be explained. FIG. 3 is a schematic illustration showing, an example of a conventional solid die for flat wire coating, a cross sectional view, and longitudinal sectional views along lines A and B. As illustrated in FIG. 3, a conventional solid die 10 for flat wire coating includes a die body 8 and a die hole 9 for passing flat wire conductors therethrough. The die hole 9 includes: An entry portion having a cross section monotonically decreasing along the conductor insertion direction; a coating portion having a constant cross section; and an outlet portion having a monotonically increasing cross section.

Figure 4:
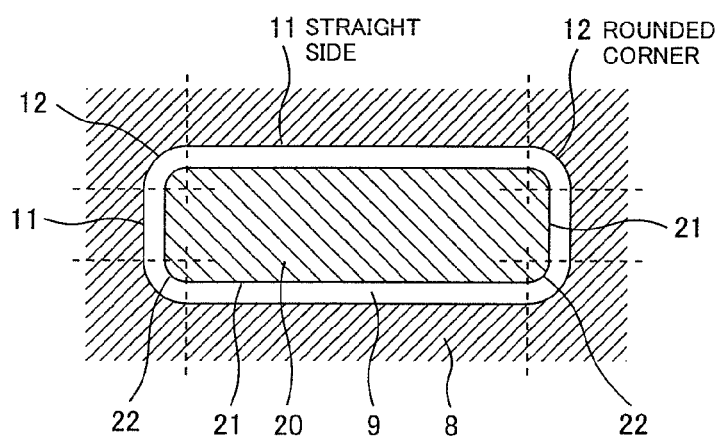
FIG. 4 is an enlarged schematic illustration showing a cross sectional view of a coating portion of a conventional solid die for flat wire coating, where a flat wire conductor is passing through the coating portion.

FIG. 4 is an enlarged schematic illustration showing a cross sectional view of a coating portion of a conventional solid die for flat wire coating, where a flat wire conductor 20 is passing through the coating portion. As illustrated in FIG. 4, the coating portion of the die hole 9 has a rectangular cross section having four straight sides 11 and four rounded corners 12. And, the flat wire conductor 20 to be coated also has a rectangular cross section having four straight sides 21 and four rounded corners 22.

The die hole 9 is slightly larger than the flat wire conductor 20. And, the flat wire conductor 20 is coated with an insulation varnish by supplying the varnish into a gap between the die hole 9 and the flat wire conductor 20. Thus, accurate positioning (centering) of the conductor 20 in the hole 9 (i.e., accurate alignment between the hole 9 and the conductor 20) is necessary to evenly apply the varnish around the conductor 20.

In many cases, such an insulation varnish application and baking process as described above is repeated several times using different dies until a desired enamel coating thickness is obtained. Therefore, the above-described centering procedure also needs to be repeated for each varnish application process, thus incurring a problem of an increased overall centering procedure time (therefore, the problem of increased cost). Meanwhile, the degree of centering during each insulation varnish application and baking process is typically estimated by observation of a cross section of the resulting enameled wire.

Figure 5:
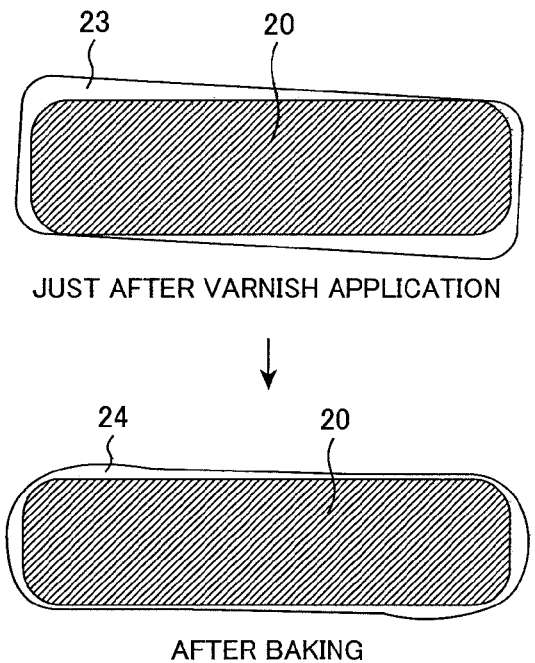
FIG. 5 is a schematic illustration showing a cross sectional view of a case in which an insulation coating is formed around a flat wire conductor in a tilting relationship with each other when a conventional solid die is used for the flat wire coating.

FIG. 5 is a schematic illustration showing a cross sectional view of a case in which an insulation coating is formed around a flat wire conductor in a tilting relationship with each other when a conventional solid die is used for the flat wire coating. As illustrated in FIG. 5, the flat wire conductor 20 is covered with the applied varnish 23 (the insulation coating 24) in a tilted and/or off-centered relationship both after the varnish application and after the baking. This phenomenon occurs relatively often in conventional processes of manufacturing flat wires.

A probable cause of such significant tilting and/or off-centering as shown in FIG. 5 is as follows: As already described, the cross section of the die hole 9 of the solid die 10 has the four straight sides 11 and the four rounded corners 12. Therefore, an insulation varnish supplied does not evenly flow around the flat wire conductor 20 because the supplied varnish tends to flow into and accumulate on the corners 12. As a result, once the conductor 20 is misalignedly inserted into the hole 9 or is caused to be misaligned by vibration or other factors after insertion, the conductor 20 cannot readily self-align relative to the hole 9.

Figure 6:
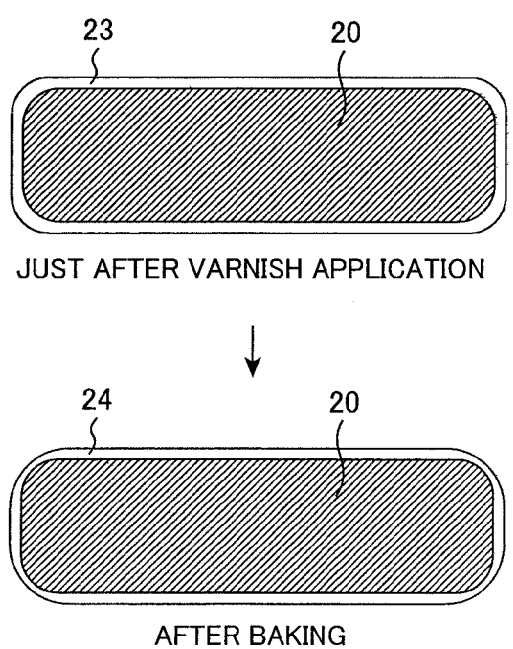
FIG. 6 is a schematic illustration showing a cross sectional view of an example of an enameled flat wire formed by using a conventional solid die that suffers from an undesirable local thickening/thinning phenomenon.

FIG. 6 is a schematic illustration showing a cross sectional view of an example of an enameled flat wire formed by using a conventional solid die that suffers from an undesirable local thickening/thinning phenomenon. As illustrated in FIG. 6, the flat wire conductor 20 is evenly covered with the applied varnish 23 just after the varnish application. However, after the baking, the insulation coating 24 becomes thinner on the rounded corners 22 of the flat wire conductor 20 and becomes thicker than designed on the straight sides (flat surfaces) 21.

Figure 7:
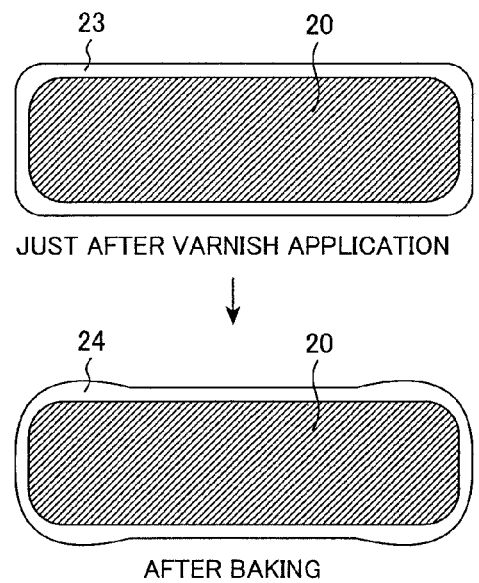
FIG. 7 is a schematic illustration showing a cross sectional view of another example of an enameled flat wire formed by using a conventional solid die that suffers from an undesirable local thickening/thinning phenomenon.

As previously described, one commonly employed solution to this problem is that an insulation varnish is applied thicker on the rounded corners 22 than on the flat surfaces 21. The effectiveness of such solutions was evaluated. FIG. 7 is a schematic illustration showing a cross sectional view of an example of an enameled flat wire formed by using a conventional solid die and the above-described non-uniform varnish application method which still suffers from an undesirable local thickening/thinning phenomenon.

As illustrated in FIG. 7, the varnish applied on each rounded corner flows toward the neighboring flat surfaces as expected, but a thicker coating region is formed on both sides of the rounded corner, as a result exhibiting a more distinct dog-bone surface. Thus, the above-described non-uniform varnish application method still cannot offer a truly effective solution. Further, the dependency of the dog-bone surface formation on the thickness of the varnish 23 applied on the rounded corners 12 was examined. The results show that the smaller the minimum curvature radius of the rounded corners 12 of the die hole 9 is than the minimum curvature radius of the rounded corners 22 of a flat wire conductor 20, the more pronounced the dog-bone phenomenon becomes.

A probable cause of such an undesirable local thickening/thinning phenomena as shown in FIGS. 6 and 7 is as follows: The surface curvatures (the inverses of the curvature radiuses) of an insulation varnish applied on each rounded corner of a flat wire conductor are different from (larger than) the surface curvatures on the adjacent flat surfaces. Thus, a surface curvature (surface tension) effect (a driving force of mass transfer caused by curvature difference) is exerted on the applied varnish during the coating process (just after the varnish application until the completion of the baking). And, such a surface curvature effect drives the varnish applied on each rounded corner of the conductor to flow toward the neighboring flat surfaces of the varnish. According to this assumption, it can be naturally inferred that the driving force of mass transfer in the FIG. 7 case (in which the minimum curvature radius of the rounded corners 12 of the die hole 9 is smaller than that of the rounded corners 22 of the flat wire conductor 20) is stronger than that in the FIG. 6 case (in which the minimum curvature radius of the corners 12 is approximately the same as that of the corners 22).

Preferred embodiments of the present invention will be described below. However, the invention is not limited to the specific embodiments described below, but various combinations and modifications are possible without departing from the spirit and scope of the invention.

(Outline Structure of Solid Die for Flat Wire Coating)

Figure 8:
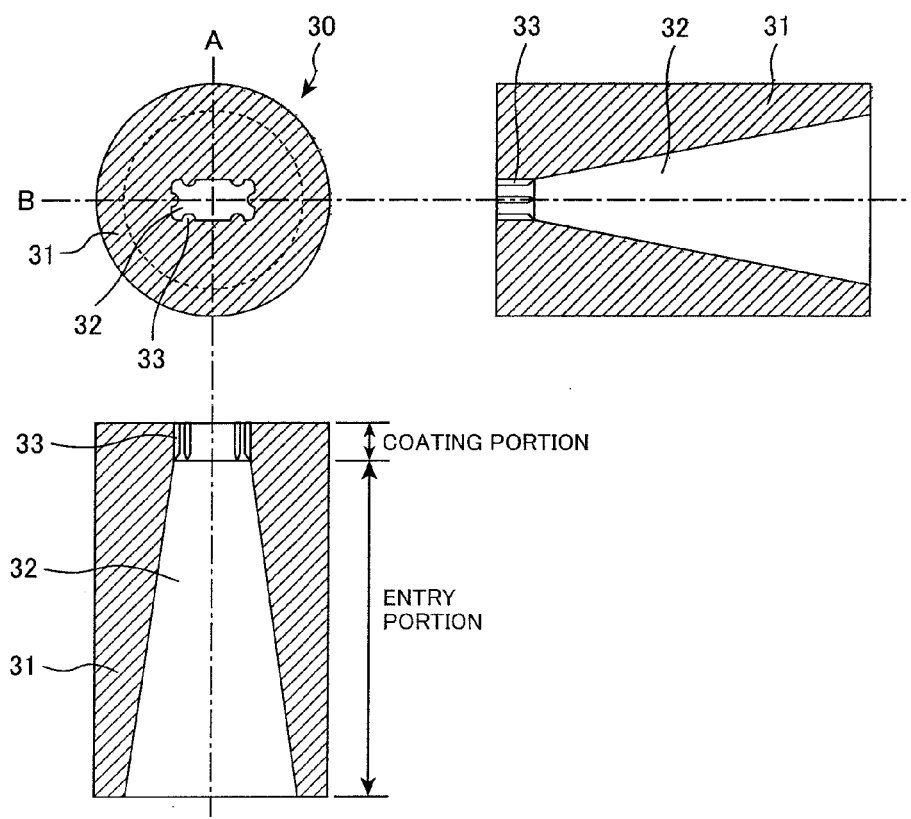
FIG. 8 is a schematic illustration showing, an example of a solid die for flat wire coating according to the present invention, a cross sectional view, and longitudinal sectional views along lines A and B.

FIG. 8 is a schematic illustration showing, an example of a solid die for flat wire coating according to the present invention, a cross sectional view, and longitudinal sectional views along lines A and B. As illustrated in FIG. 8, an invented solid die 30 for flat wire coating includes a die body 31 and a die hole 32 for passing flat wire conductors therethrough. The die hole 32 includes: An entry portion having a cross section monotonically decreasing along the conductor insertion direction; and a coating portion that at least includes a subportion having a constant cross section. The die hole 32 has a rectangular cross section, and has a plurality of inwardly projecting protrusions 33 on its inner surface. Meanwhile, as is often employed in wire drawing dies, the die body 31 may include, as a peripheral part of the die hole 32, a nib and a nib holder for housing the nib.

Next, each part of the invented solid die for flat wire coating will be explained in detail.

(Die Hole)

Figure 9:
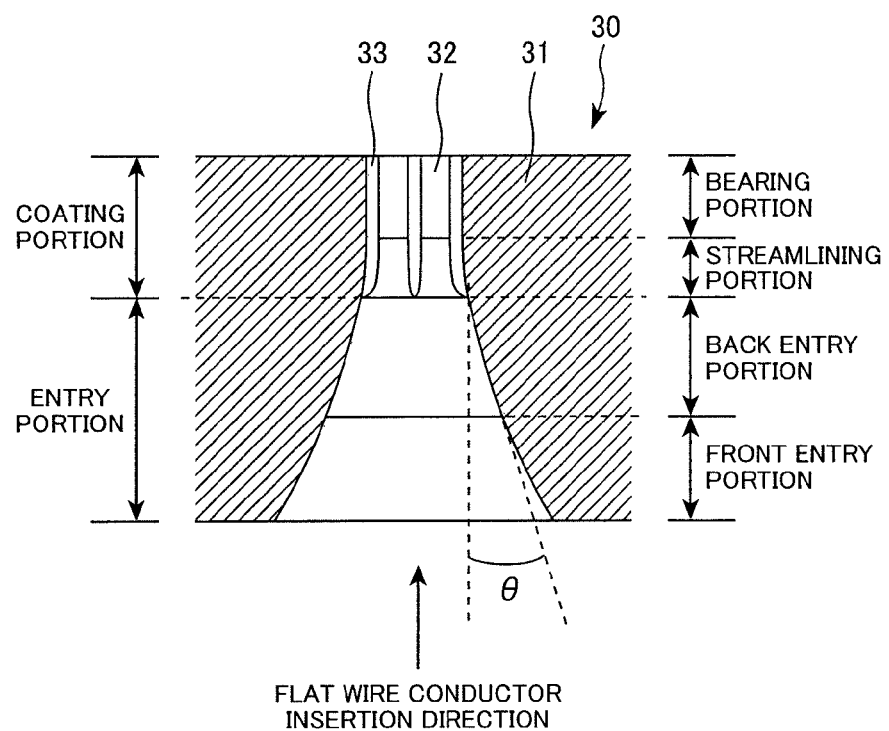
FIG. 9 is an enlarged schematic illustration showing a longitudinal sectional view of a die hole of an invented solid die for flat wire coating.

FIG. 9 is an enlarged schematic illustration showing a longitudinal sectional view of a die hole of an invented solid die for flat wire coating. As illustrated in FIG. 9, the entry portion has a monotonically decreasing cross section. The entry portion of FIG. 9 has front and back entry portions each having a different average taper angle. However, the entry portion may be configured with only the back entry portion. The back entry portion preferably has an average taper angle θ for example of 10° to 16°. The coating portion has at least a bearing portion having a constant cross section. The coating portion may include, on the conductor inlet side, a front streamlining (laminarizing) portion having a monotonically decreasing cross section and/or, on the conductor outlet side, a back streamlining (laminarizing) portion having a monotonically increasing cross section. Or, the coating portion may be configured with only the bearing portion.

Although, for simplicity of description, the taper angle of the inner surface of the FIG. 9 die hole abruptly changes at each boundary between adjacent die hole portions, the die hole inner surface is preferably formed to have a taper angle that gradually changes at each boundary. The protrusions 33 will be detailed later.

Figure 10:
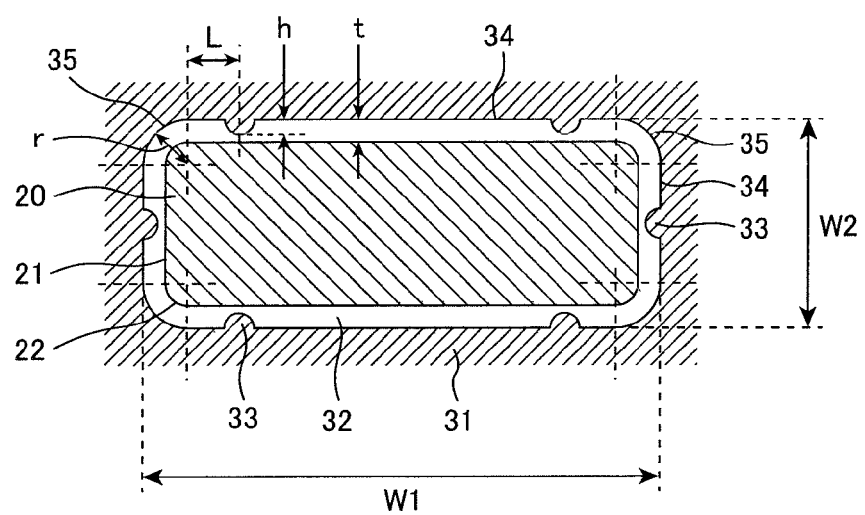
FIG. 10 is an enlarged schematic illustration showing a cross sectional view of a bearing portion (having a constant cross section) of a coating portion of a die hole of an invented solid die for flat wire coating, in which a flat wire conductor is passing through the bearing portion.

FIG. 10 is an enlarged schematic illustration showing a cross sectional view of a bearing portion (having a constant cross section) of a coating portion of a die hole of an invented solid die for flat wire coating, in which a flat wire conductor is passing through the bearing portion. As illustrated in FIG. 10, similarly to the die hole 9 of the solid die 10 in FIG. 4, a bearing portion of a die hole 32 of an invented solid die 30 for flat wire coating has a rectangular cross section having four straight sides (flat surfaces) 34 and four rounded corners 35. However, the bearing portion of the solid die 30 has protrusions 33 on each flat surface 34, unlike the solid die 10 in FIG. 4.

The cross section of the bearing portion of the die hole 32 is not limited to any particular size, but is determined based upon the size of the flat wire conductor 20 to be coated and the desired coating thickness. Preferably, for example, the length W1 is from 1 to 17 mm, and the length W2 is from 0.5 to 4 mm.

(Protrusion)

As illustrated in FIGS. 9 and 10, each protrusion 33 on the inner surface of the coating portion of an invented solid die 30 is an elongated ridge which preferably runs parallel to the conductor insertion direction. Furthermore, each protrusion 33 preferably extends along the entire length of the coating portion.

These protrusions 33 work as a streamlining plate for streamlining (laminarizing) the flow of an insulation varnish supplied, thus suppressing nonuniform (turbulent) varnish flow and as a result suppressing misalignment between the flat wire conductor 20 and the insulation coating around the conductor 20. The protrusions 33 also mechanically suppress significant off-centering and/or tilting of the conductor 20, thus reducing unevenness in coating thickness.

The top contour (perpendicular to the conductor insertion direction) of each protrusion 33 is preferably a circular arc, an elongated circular arc or an elliptical arc. In addition, the maximum curvature of the top contour of the protrusions 33 is preferably larger than that of the rounded corners 35. Thus, the surface of the top portion of each protrusion 33 is free from sharp edges. Therefore, even when the flat wire conductor 20 contacts a protrusion (protrusions) 33 during the coating process, it will not be damaged.

As just described, the maximum curvature of the top portion of the protrusions 33 is formed to be larger than that of the rounded corners 35. This has the following effects and advantages: As described before, conventional solid dies for flat wire coating have a problem in which an insulation varnish applied on the rounded corners of a flat wire conductor is prone to flow into the flat surfaces thereof. And, this is probably caused by a difference between the surface curvature of the varnish applied on the rounded corners and that of the varnish applied on the flat surfaces.

According to the present invention, in order to solve this problem, an insulation varnish is applied around a flat wire conductor in such a manner that regions having a maximum surface curvature larger than the maximum surface curvature of the varnish applied on the rounded corners of the conductor are intentionally and optimally formed in the applied varnish (these large curvature regions are actually depressions 36 created by the protrusions 33, see later-described FIG. 11). These depressions 36 provide a varnish surface curvature difference larger than the difference between the varnish surface curvature on the rounded corners and the varnish surface curvature on the flat surfaces. This feature of the invention probably produces the following effects: Mass transfer into the above-described large curvature depressions caused by a surface curvature difference predominantly occurs rather than mass transfer from the varnish surfaces on the rounded corners to the varnish surfaces on the flat surfaces. That is, mass transfer from the varnish surfaces on the rounded corners can be retarded to some extent. As a result, an insulation varnish applied on a flat wire conductor can be baked before the varnish applied on the rounded corners of the conductor starts to deform.

Preferably, each protrusion 33 is positioned within a certain distance from a rounded corner 35 nearest to the protrusion 33. More specifically, the distance L between each protrusion 33 and the nearest rounded corner 35 (see FIG. 10 for the precise definition of the distance L) is preferably equal to or shorter than the minimum curvature radius r of the nearest rounded corner 35 (i.e., L≤r). The height h of the protrusions 33 is properly sized based on the desired coating thickness, the number of coatings, and other factors. For example, the height h is preferably from 50% to 90% of the gap t between the die hole 32 and the flat wire conductor 20, and more preferably from 50% to 75%. The cross sectional area of the protrusions 33 is properly sized based on the desired total coating thickness and other factors.

Figure 11:
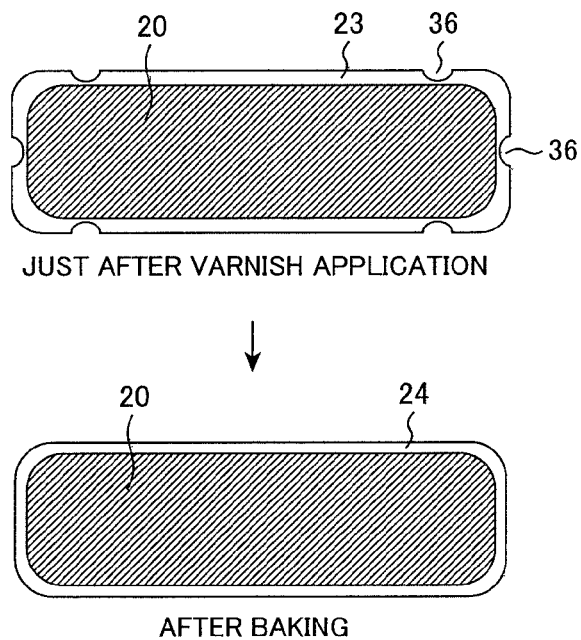
FIG. 11 is a schematic illustration showing a cross sectional view of an example of a flat wire covered with an insulation coating by using an invented solid die.

FIG. 11 is a schematic illustration showing a cross sectional view of an example of a flat wire covered with an insulation coating by using an invented solid die. As illustrated in FIG. 11, just after the varnish application, an insulation varnish 23 is evenly applied around a flat wire conductor 20 except for the depressions 36 caused by the protrusions 33. On the other hand, after the baking, the depressions 36 disappear and an insulation coating 24 having a uniform thickness (e.g., 20 μm) is formed around the entire surface of the conductor 20.

As has been described, the coating portion of the invented solid die for flat wire coating has a plurality of inwardly projecting protrusions on its inner wall. This configuration enables an insulation coating having a uniform thickness to be controllably formed around a flat wire conductor. Also, according to the invention, the coating thickness on each flat surface of a flat wire conductor can be independently adjusted by changing the height of the protrusions formed on the corresponding die hole surface. In view of various specifications of enameled flat wires, it is preferable that the protrusions on at least two of the four flat inner surfaces of the coating portion of an invented solid die have the same height (or, the highest heights of the protrusions on at least two of the four flat inner surfaces are the same).

Figure 12:
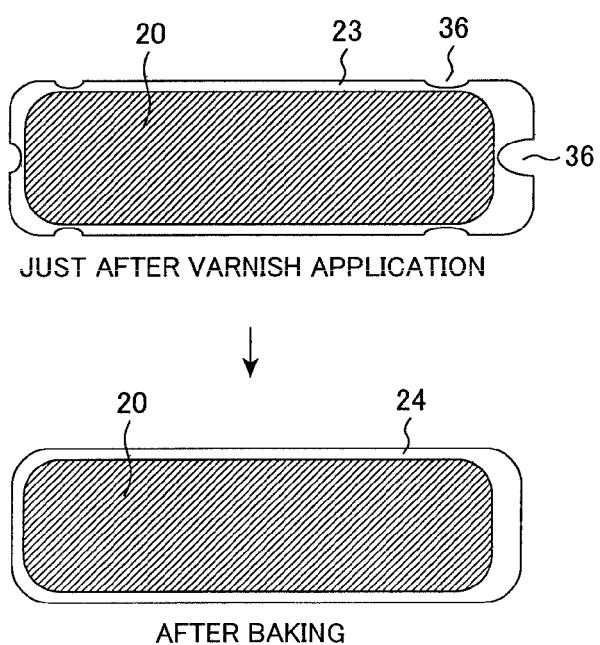
FIG. 12 is a schematic illustration showing a cross sectional view of another example of a flat wire covered with an insulation coating by using an invented solid die.

FIG. 12 is a schematic illustration showing a cross sectional view of another example of a flat wire covered with an insulation coating by using an invented solid die. As illustrated in FIG. 12, just after the varnish application, the insulation varnish 23 applied on three flat surfaces of the flat wire conductor have the same thickness, but the varnish 23 applied on the other flat surface has a thicker thickness. Similarly to the FIG. 11 varnish application, the varnish applied on each flat surface has the depressions 36. Also, the flat wire conductor 20 did not suffer from any twisting. After the baking, the depressions 36 disappear similarly to the FIG. 11 case. As a result, around the flat wire conductor 20 is formed an insulation coating 24 having the same desired thickness (e.g., 20 μm) on three of the flat surfaces and a desired thicker thickness (e.g., 100 μm) on the other surface. Such an enameled flat wire as illustrated in FIG. 12 can be formed by using an invented solid die 30 in which the protrusions 33 on three flat inner surfaces 34 of the coating portion have the same height and the protrusions 33 on the other surface 34 has a higher height.

EXAMPLES

The present invention will be more specifically described below by way of examples. However, the invention is not limited to the specific examples below.

Two types of insulation coatings of a designed thickness of 20 μm were formed around a flat wire conductor having a cross section of 1.0 mm×5.0 mm. The insulated flat wire of Comparative Example 1 was formed by applying an insulation varnish around the flat wire conductor using a conventional solid die (see, e.g., FIG. 3) and by baking it. The insulated flat wire of Example 1 was formed by applying an insulation varnish around the flat wire conductor using an invented solid die (see, e.g., FIG. 8) and by baking it.

The thickness distribution of each insulation coating after the baking was measured by optical microscopy. The breakdown voltage of each enameled flat wire was measured according to Method B of JIS C 3003: 1999 (Methods of test for enameled wires). These results are summarized in Table 1. The above thickness distribution measurement was conducted as follows: Each enameled flat wire was transversely cut at five positions. Then, for each cut surface, the coating thickness was measured on eight different points of the flat surfaces of the flat wire conductor and on four different points of the rounded corners. The breakdown voltage of each example given in Table 1 was determined by averaging the breakdown voltages measured on ten specimens.

TABLE 1

Coating thickness distribution and measurement results of breakdown voltage of coating.

| | Coating Thickness | | | |
|---|---|---|---|---|
| | On Flat Surface (μm) | On Rounded Corner (μm) | Difference between Max and Min Thicknesses (μm) | Breakdown Voltage (kV) |
| Comparative Example 1 | 15-26 | 12-13 | 14 | 3.26 |
| Example 1 | 20-25 | 23-24 | 5 | 4.71 |

As is apparent from Table 1, in the conventional coating of Comparative Example 1, the coating is thinner on the rounded corners of the conductor and is thicker on part of the flat surfaces (clearly indicating the formation of a dog-bone surface along and near the rounded corners). The thickness difference between the thickest and thinnest points was as large as 14 μm. By contrast, in the invented coating of Example 1, the difference between the resulting thickness and the designed thickness is smaller on both regions (on the rounded corners and on the flat surfaces). And, the thickness difference between the thickest and thinnest points is as small as about ⅓ of that of the conventional coating. Also, the breakdown voltage of the enameled wire of Example 1 is improved to about 1.4 times that of the enameled wire of Comparative Example 1.

The results described above demonstrate that, by using the invented solid die for flat wire coating, the entire surface of a long flat wire conductor can be stably coated with an insulation coating having, on each straight side of the conductor, a uniform desired thickness without any undesirable significant local thickening/thinning. In addition, an insulation coating having the features just described above can be formed by both vertical and horizontal coating apparatuses employing the invented solid die.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A manufacturing method of an enameled flat wire using a predetermined solid coating die, comprising:
   providing a solid coating die comprising:
      a die body; and
      a die hole formed through the die body, the flat wire conductor to be inserted into the die hole in a conductor insertion direction, the die hole including:
         an entry portion having a cross section monotonically decreasing along the conductor insertion direction; and
         a coating portion including at least a sub-portion having a constant cross section, the cross section of the coating portion being a rectangle having four straight sides and four rounded corners, the coating portion having a flat inner surface corresponding to each straight side of the rectangular cross section of the coating portion, the coating portion having a rounded inner surface corner corresponding to each rounded corner of the rectangular cross section of the coating portion, each flat inner surface of the coating portion having an inwardly projecting protrusion, a top contour (perpendicular to the conductor insertion direction) of each protrusion being a circular arc, an elongated circular arc, an elliptical arc or a combination of these arcs, the maximum curvature of the top contour of each protrusion being larger than the maximum curvature of the rounded inner surface corners;

inserting the flat wire conductor into the die hole of the solid coating die;

applying an insulation varnish around the flat wire conductor in the die hole; and baking the applied insulation varnish.

2. The manufacturing method according to claim 1, wherein a distance between each protrusion and nearer side of one of the rounded inner surface corners that is nearest to the protrusion is shorter than a predetermined value.

3. The manufacturing method according to claim 2, wherein the predetermined value is the minimum curvature radius of the rounded inner surface corner that is nearest to the protrusion.

4. The manufacturing method according to claim 1, wherein each protrusion is an elongated ridge running parallel to the conductor insertion direction.

5. The manufacturing method according to claim 1, wherein each protrusion extends in the conductor insertion direction and along an entire length of the coating portion.

6. The manufacturing method according to claim 2, wherein the protrusions on at least two of the four flat inner surfaces have the same height.

* * * * *